United States Patent [19]

Bergmann

[11] Patent Number: 4,697,620
[45] Date of Patent: Oct. 6, 1987

[54] SANITARY VALVE ASSEMBLY

[75] Inventor: Konrad Bergmann, Wittlich, Fed. Rep. of Germany

[73] Assignee: American Standard Inc., New York, N.Y.

[21] Appl. No.: 884,937

[22] Filed: Jul. 14, 1986

[30] Foreign Application Priority Data

Jul. 13, 1985 [DE] Fed. Rep. of Germany ....... 3525053

[51] Int. Cl.⁴ ..................... F16K 11/078; F16K 39/04
[52] U.S. Cl. ........................... 137/625.17; 137/625.4;
137/636.2; 251/281; 251/282; 251/368
[58] Field of Search ............ 137/625.17, 625.41,
137/625.4, 636.2, 636, 625.45; 251/368, 282,
283, 301, 281

[56] References Cited

U.S. PATENT DOCUMENTS

| | | | |
|---|---|---|---|
| 2,182,459 | 12/1939 | Vickers | 251/283 X |
| 2,364,697 | 12/1944 | Daniels | 251/283 X |
| 2,938,544 | 5/1960 | Simpson | 251/283 |
| 3,924,832 | 12/1975 | Babcock | 137/625.45 X |
| 4,420,142 | 12/1983 | Dworak et al. | 137/625.41 X |
| 4,609,007 | 9/1986 | Uhl | 137/625.41 X |

FOREIGN PATENT DOCUMENTS 1116005 10/1961 Fed. Rep. of Germany ...... 251/283

Primary Examiner—Alan Cohan
Assistant Examiner—John Rivell
Attorney, Agent, or Firm—James J. Salerno, Jr.; Robert G. Crooks; John P. Sinnott

[57] ABSTRACT

A sanitary valve assembly for controlling the flow of hot and cold water, which includes at least two superimposed annular control elements arranged and constructed to provide at least two passgeways therethrough with a control lever operable coupled to one of the control elements for proportioning both hot and cold water therethrough. The control elements are formed having reduced surface areas for effecting a watertight seal.

7 Claims, 10 Drawing Figures

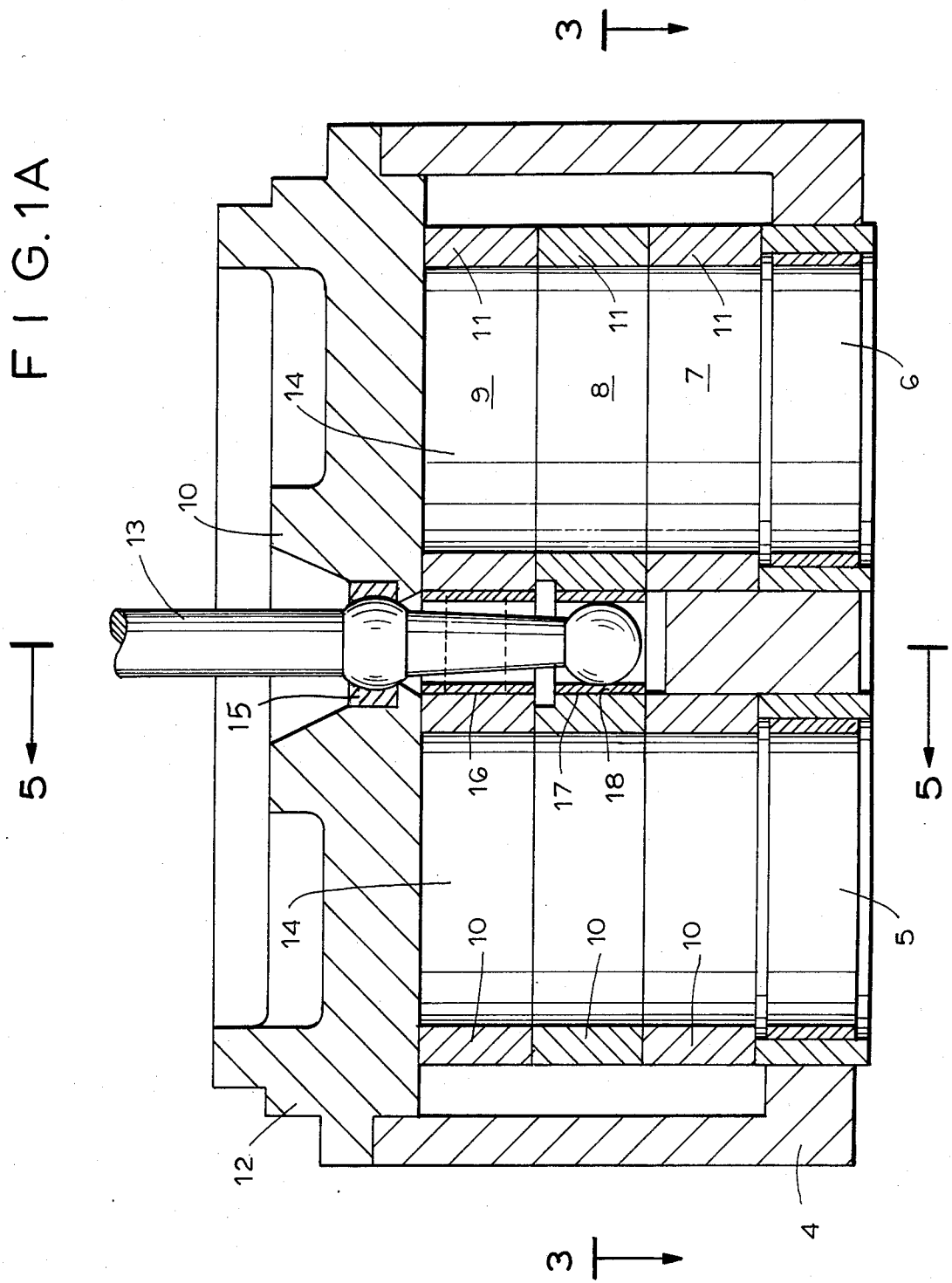

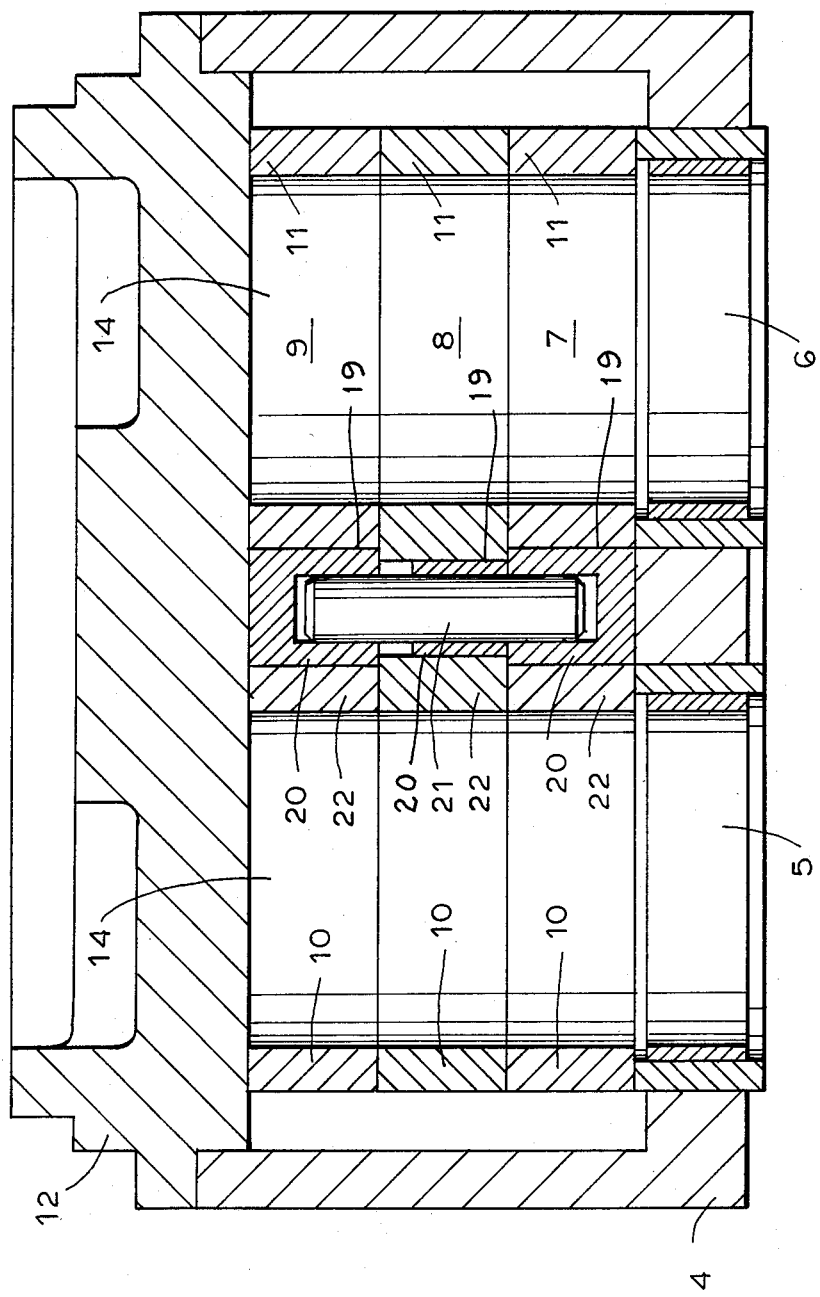

F I G. 5
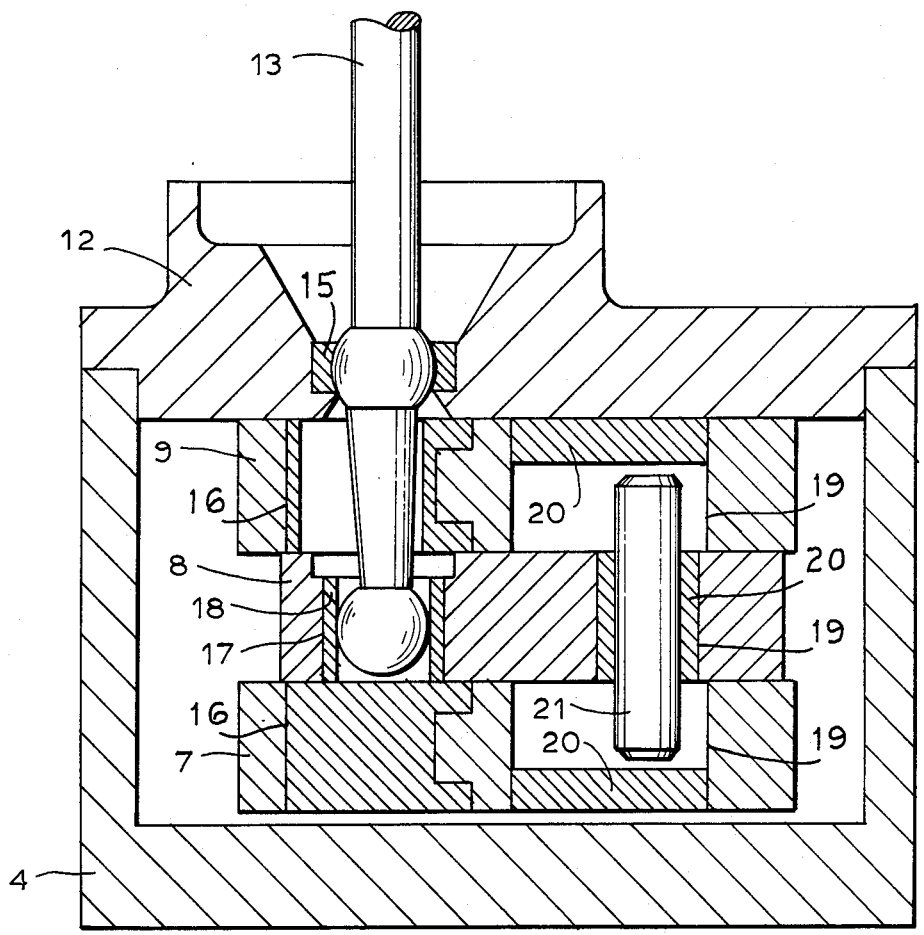

F I G. 8
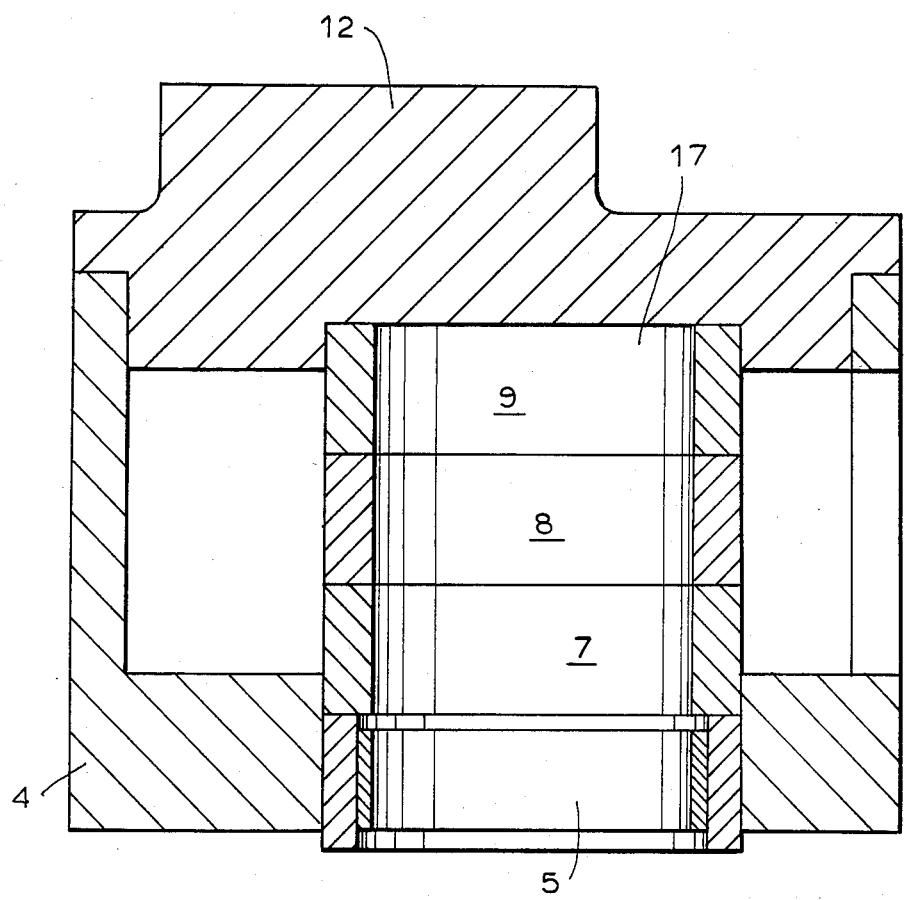

SANITARY VALVE ASSEMBLY

BACKGROUND OF THE DISCLOSURE

1. Field of the Invention

The invention relates to a sanitary valve assembly and, more particularly, to a mixing valve assembly having at least two control elements, one of which is in the form of a stationary valve seat connected to the water supply line or lines and with a movable control element displaceable on it, the surfaces of the control elements facing towards one another being designed as sealing surfaces.

2. Description of the Prior Art

Valves of this general type are, as a rule, provided with disc-shaped control elements of a ceramic material and have been found to be successful. A disadvantage of the known valves is that the discs have relatively large sealing areas, which require the body of the mixing valve to have relatively large structural dimensions. Additionally, relatively large hydraulic pressure areas on the underside of the valve seat disc are required to hold the discs together. The valves are also constructed with each flow aperture in the stationary valve seat disc accurately associated with only one control port or control edge for advancing the water. Consequently, the flow rates are comparatively low despite the large structural dimensions. Another disadvantage is that the relatively large sealing areas which, in turn, necessitate relatively large pressure areas, give rise to corresponding frictional forces.

SUMMARY OF THE INVENTION

The problems and disadvantages heretofore encountered are overcome by providing a sanitary valve of the above type, which is simple in construction and reliable in operation and which has high flow rates despite its small structural dimensions.

The sanitary valve assembly, according to the present invention, includes control elements that are at least partly annular in shape, and which are formed having relatively narrow sealing surfaces so that when the valve assembly is in its opened position, the control elements partly lie over one another and are partially out of sealing engagement. It is preferable that three superimposed control elements are provided, of which the two outer control elements are stationary, while the central element is movable. When the valve assembly is in the closed and/or opened positions, the central control element directs the water or portions of the water against an outer control element, which has a diverting chamber and which is permanently under the inflow pressure.

BRIEF DESCRIPTION OF THE DRAWINGS

FIG. 1A is an enlarged fragmentary sectional view illustrating the cartridge which houses the control elements, taken along the line 1A-1A of FIG. 1;

FIG. 2 is an enlarged sectional view of the control elements taken along line 2—2 of FIG. 1;

FIG. 5 is a sectional view taken along line 5—5 of FIG. 1A, but with the movable control element in its closed position;

FIG. 8 is a sectional view taken along line 8—8 of FIG. 3, showing a movable control element in its closed position.

DETAILED DESCRIPTION OF THE PREFERRED EMBODIMENT

Figure 1:
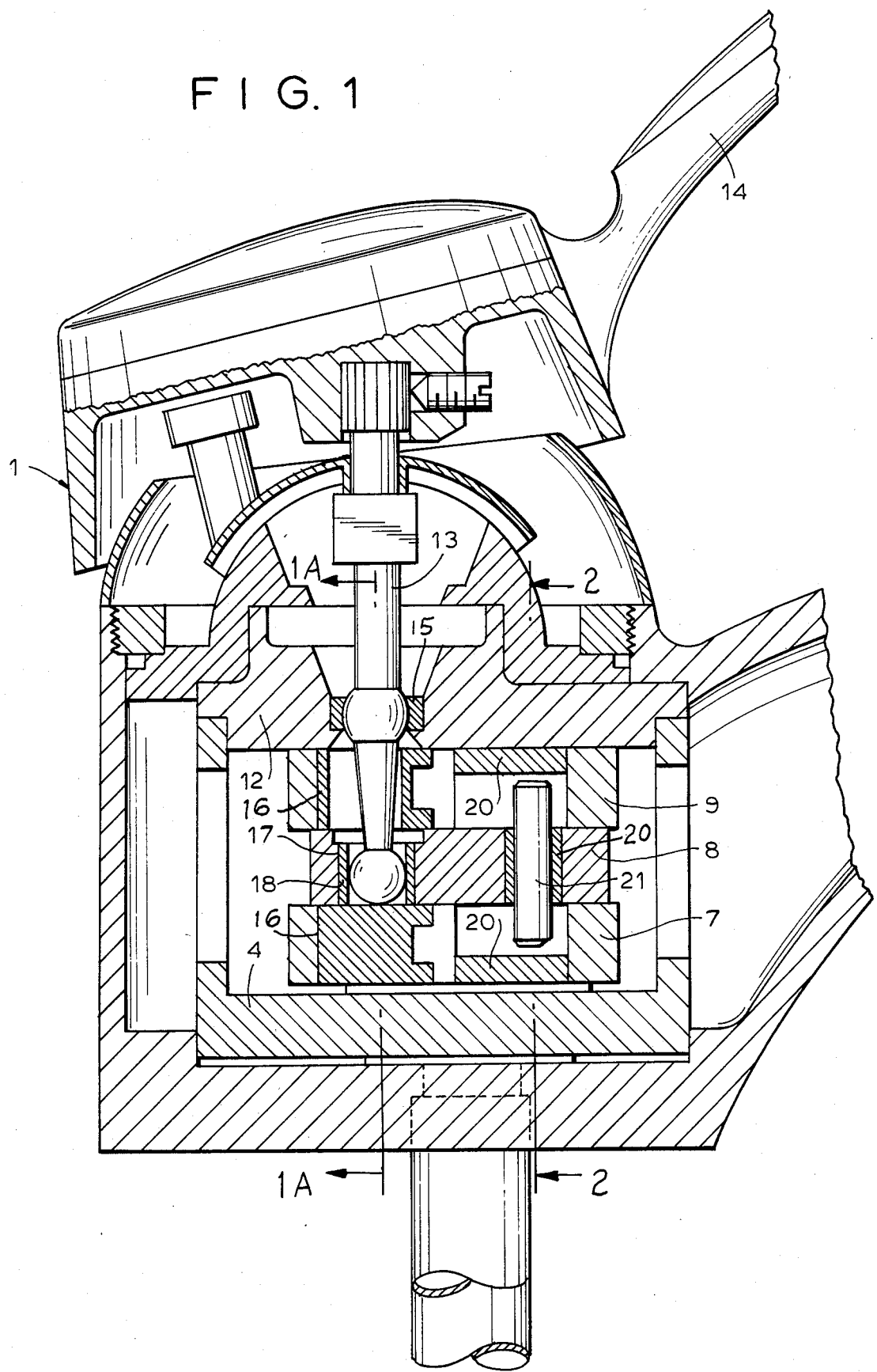
FIG. 1 is a longitudinal sectional view of a sanitary valve assembly wherein the control elements of the present invention are illustrated in the closed position.
Figure 3:
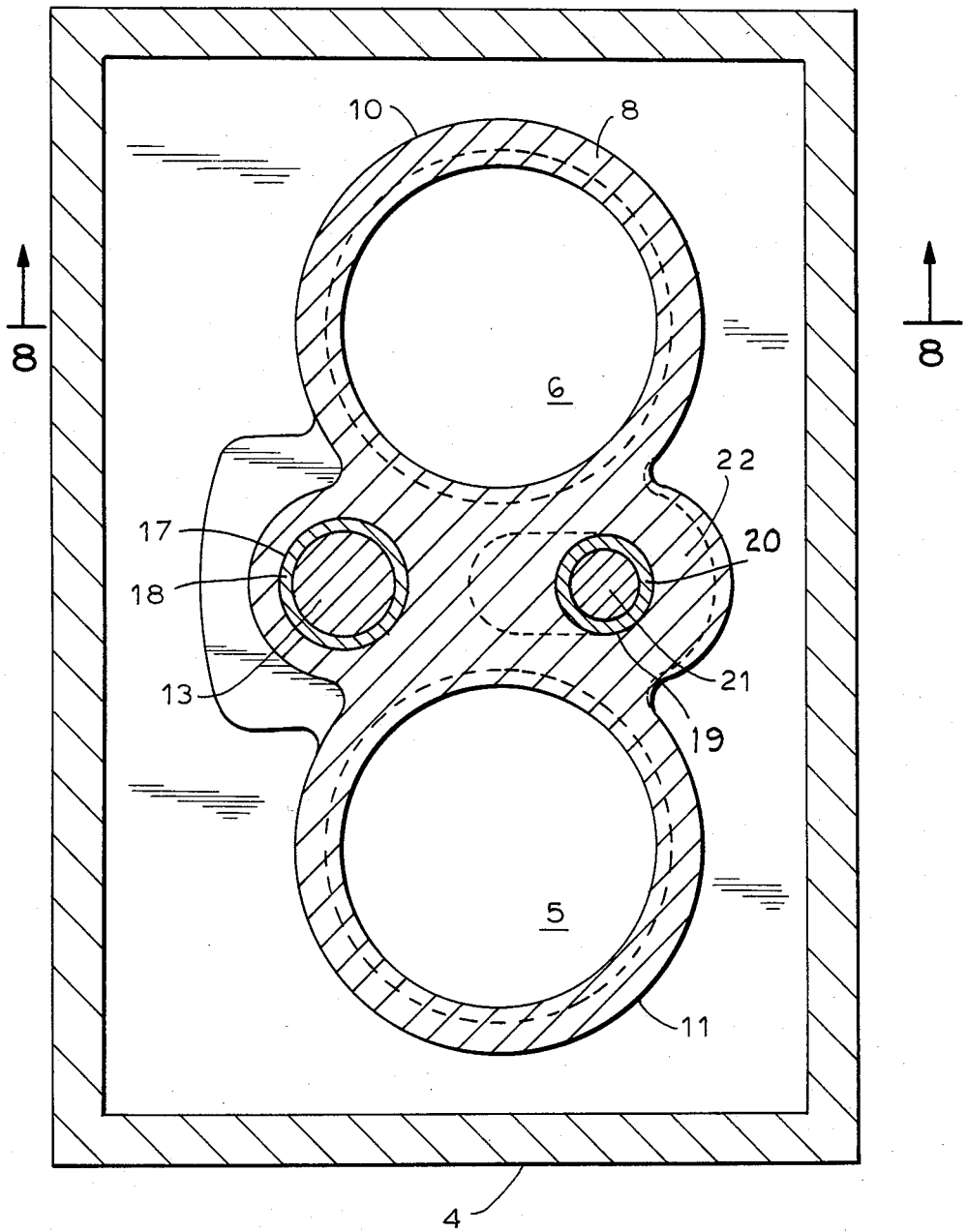
FIG. 3 is a sectional view of the control elements taken along the line 3—3 of FIG. 1A.
Figure 4:
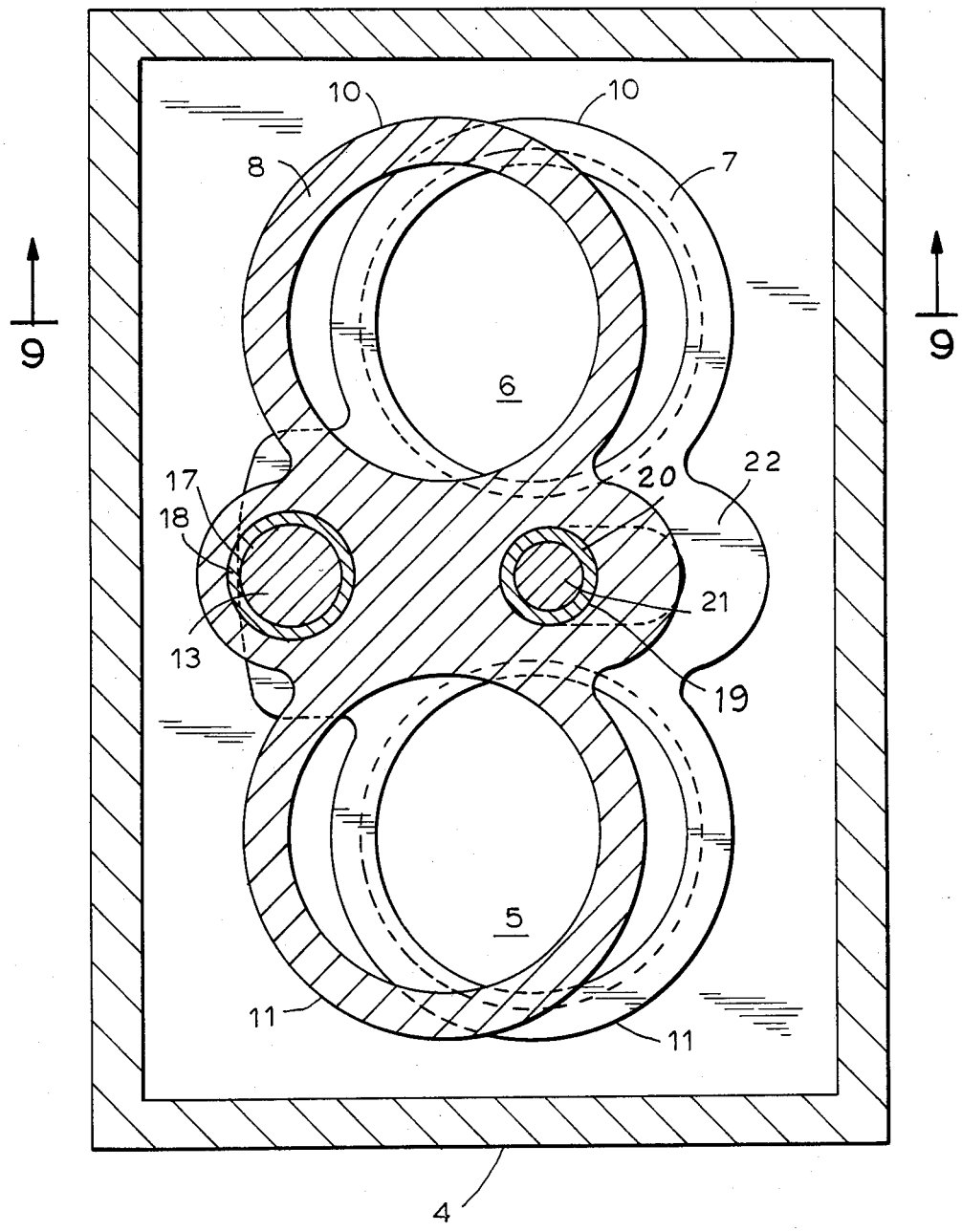
FIG. 4 is a view similar to FIG. 3, illustrating the movable control element in its opened position.
Figure 6:
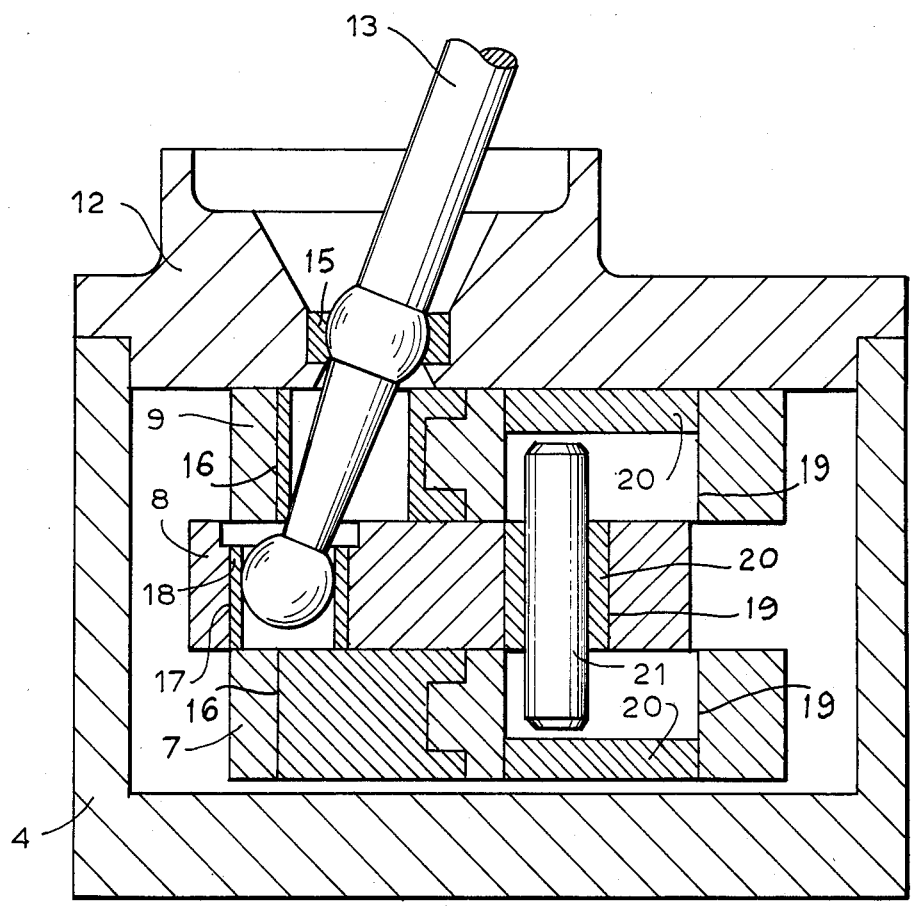
FIG. 6 is a view similar to FIG. 5 but illustrating the movable control element in its opened position.
Figure 7:
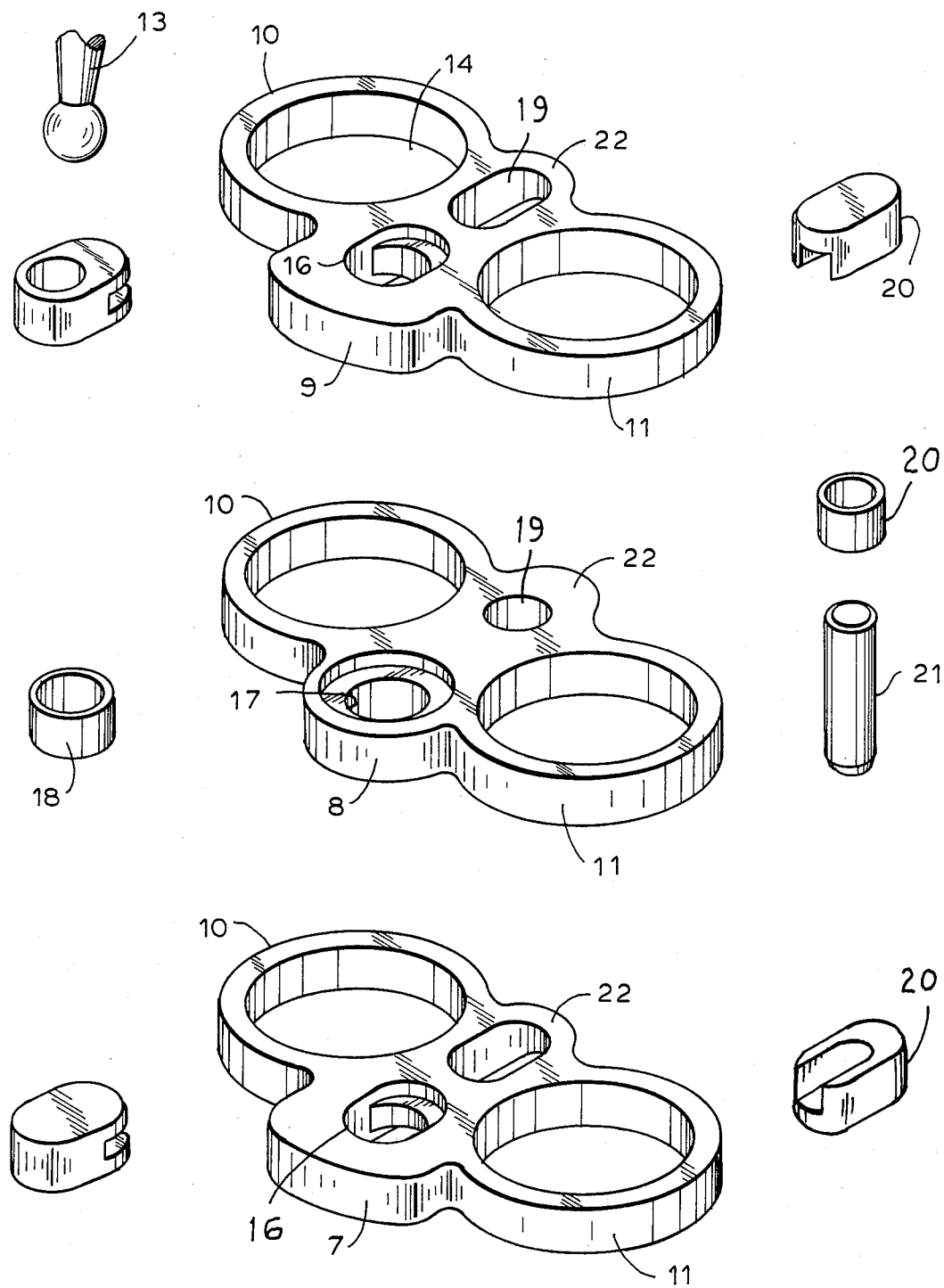
FIG. 7 is an exploded isometric view of the control elements with the cartridge removed.
Figure 9:
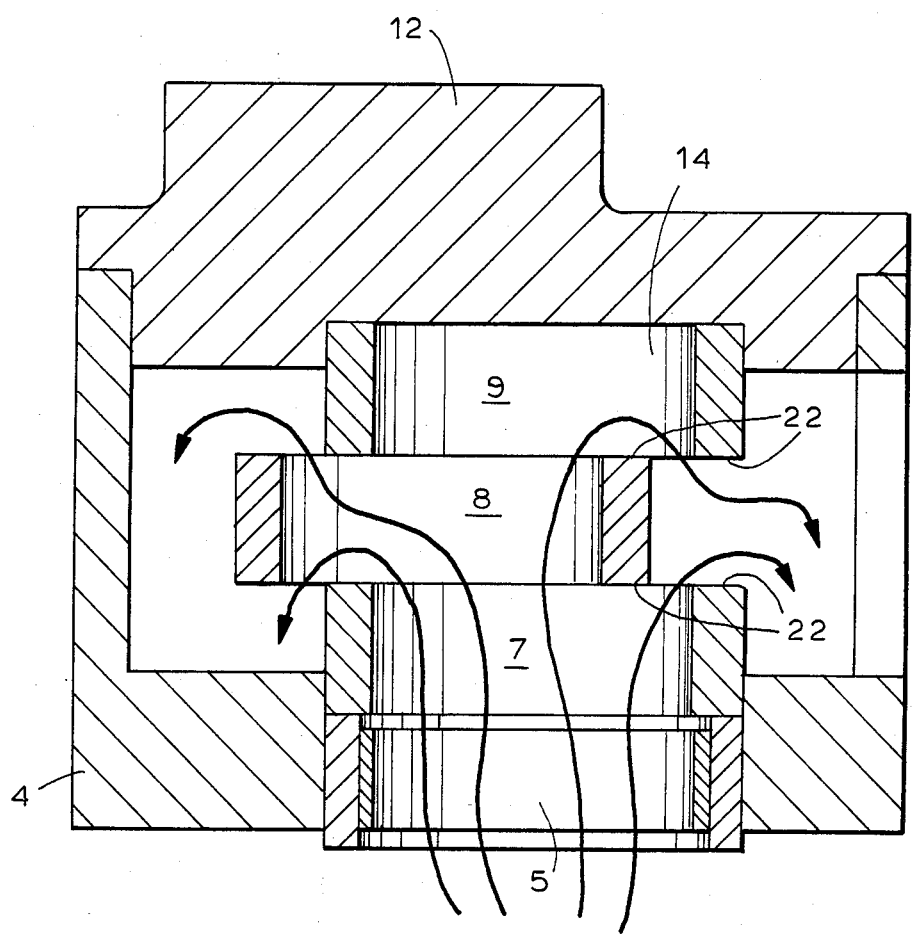
FIG. 9 is a sectional view taken along the line 9—9 of FIG. 4, illustrating the flow path through the control elements in their open position.

Sanitary valve assembly 1 of FIG. 1 is illustrated in its various operable positions in FIGS. 1A—6, 8 and 9. Cartridge 4, which houses control elements 7, 8, 9, is provided with two inlets 5, 6 for cold and hot water. Control elements 7, 8, 9 are superimposed, which control the flow of hot and cold water through valve 1. The three control elements 7, 8, 9 each has two annular portions 10, 11, and each is made in one piece from a ceramic material, preferably aluminum oxide. Casing 4 is closed at the top by a cover 12 having a central opening O through which a control lever 13 engages control element 15, as seen in FIG. 1. Lever 13 can be tipped or pivoted in two planes and is joined to a handle member H. Lever 13 further extends through the outer control element 9 and engages central control element 8, which is movably mounted in sealing watertight engagement between stationary elements 7 and 9. In the opened and closed positions of the valve, the central control element 8 guides the water or portions of the water against the control element 9, which has a diverting chamber 14 and is permanently under the inflow pressure. The lever 13 is sealed externally by annular sealing surfaces 15 surrounding it. The holes 16, 17 in the elements 9, 8 are provided for the lever 13 to pass through and engage the control element 8, which has a guide bushing 18 mounted in its hole 17. Control elements 9, 8, 7 are accurately positioned and accurately guided relative to one another by means of guide bushing 20 provided in further holes 19 in the elements 7, 8, 9. A guiding and connecting pin 21 is mounted in the bushings 20, and the central control element 8 can be turned around it.

The annular control elements 7, 8, 9 have relatively narrow sealing surfaces 22, which lie partly over one another to form watertight seals in their closed positions, and are out of sealing engagement when the valve (FIG. 5) is in the opened position. From the foregoing, it can be seen that the sanitary valve assembly is made of few parts and illustrates an example of the invention while variations thereof may be made that are within the concept of the invention, for example, with respect to the arrangement and form of the various parts. It is also obvious that the control elements, according to the valve of the invention, may be modified and could be constructed as a single stop valve for cold or hot water only, so that control elements with only one hole would be used, or would provide a control element which functions as a valve seat with only a movable control element, and one with a diverting chamber.

It is claimed:

1. A sanitary valve assembly comprising; a housing and at least two control elements, said at least two control elements positioned in parallel coplanar relation and operably mounted therein, one of which is in the form of a stationary valve seat and is adapted to be coupled to a water supply source, said control elements shaped at least partly annular and formed having relatively narrow sealing surfaces; the other of said two control elements is movably and displaceably mounted on said stationary valve seat and including a control handle operably coupled thereto, said handle operated control element being in face-to-face, sealing contact with said stationary valve seat so that when said valve assembly is in its opened position, said handle operated control element is shifted linearly partially out of sealing engagement therewith.

2. The sanitary valve assembly according to claim 1 wherein said at least two control elements include three superimposed control elements, of which the two outer control elements are stationary and the central control element is formed having upper and lower sealing surfaces, and is shiftably mounted in sealing contact against corresponding sealing surfaces on said two outer control elements.

3. The sanitary valve assembly according to claim 2 wherein said central element includes means for directing at least a portion of the water to one of said outer control elements, said one outer control element having a diverting chamber formed therein so that said water in said chamber is under a constant pressure.

4. The sanitary valve assembly according to claim 2 wherein said superimposed control elements each include at least two passageways for the passage of hot and cold water therethrough, and said central control element is operably coupled to a handle mounted on said valve assembly for selectively controlling the passage of hot and cold water through said valve assembly.

5. The sanitary valve assembly according to claim 2 wherein said three superimposed control elements are formed of aluminum oxide.

6. A sanitary valve assembly which comprises a housing having three superimposed control elements, of which the two outer control elements are stationary and the central control element is formed having upper and lower sealing surfaces corresponding to sealing surfaces formed on said two outer control elements, one of said outer control elements is in the form of a stationary valve seat which is adapted to be coupled to a water supply source, said control elements being shaped at least partly annular and which are formed having relatively narrow sealing surfaces, said central control element being movably and displaceably mounted thereon in face-to-face, sealing contact with said outer control elements so that when said valve assembly is in its opened position, said three control elements are partially out of sealing engagement and said superimposed control elements each include at least two passageways for the passage of hot and cold water therethrough, said central control element operably coupled to a handle mounted on said valve assembly for selectively controlling the passage of hot and cold water through said valve assembly.

7. The sanitary valve assembly according to claim 4 wherein said hand includes a control lever, operably coupled to said central control element, and is positioned through a passage in one of said outer control elements, and annular sealing means disposed between said control lever and said superimposed control elements to form a watertight seal.

* * * * *